(12) United States Patent
Lee et al.

(10) Patent No.: US 7,607,893 B2
(45) Date of Patent: Oct. 27, 2009

(54) COUNTER TIP BAFFLE AIRFOIL

(75) Inventors: Ching-Pang Lee, Cincinnati, OH (US);
Kevin Samuel Klasing, Springboro, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 549 days.

(21) Appl. No.: 11/507,132

(22) Filed: Aug. 21, 2006

(65) Prior Publication Data
US 2008/0044291 A1 Feb. 21, 2008

(51) Int. Cl.
*F01D 5/20* (2006.01)

(52) U.S. Cl. .................. 416/228; 415/173.1

(58) Field of Classification Search ............. 415/173.1, 415/173.4, 174.4; 416/228
See application file for complete search history.

(56) References Cited

U.S. PATENT DOCUMENTS

| | | | |
|---|---|---|---|
| 3,635,585 A | 1/1972 | Metzler | |
| 3,781,129 A | 12/1973 | Aspinwall | |
| 3,854,842 A * | 12/1974 | Caudill | 415/116 |
| 4,010,531 A | 3/1977 | Andersen et al. | |
| 4,142,824 A | 3/1979 | Andersen | |
| 4,390,320 A | 6/1983 | Eiswerth | |
| 4,424,001 A | 1/1984 | North et al. | |
| 4,606,701 A | 8/1986 | McClay et al. | |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 6,039,531 A | 3/2000 | Suenaga et al. | |
| 6,059,530 A | 5/2000 | Lee | |
| 6,086,328 A | 7/2000 | Lee | |
| 6,164,914 A | 12/2000 | Correia et al. | |
| 6,224,336 B1 | 5/2001 | Kercher | |
| 6,527,514 B2 | 3/2003 | Rueloffs | |
| 6,554,575 B2 | 4/2003 | Leeke et al. | |
| 6,595,749 B2 | 7/2003 | Lee et al. | |

(Continued)

OTHER PUBLICATIONS

Mischo, B., "Flow Physics and Profiling of Recessed Blade Tips: Impact on Performance and Heat Load," ASME GT2006-91074, May 8-11, 2006, pp. 1-11.

(Continued)

*Primary Examiner*—Edward Look
*Assistant Examiner*—Nathaniel Wiehe
(74) *Attorney, Agent, or Firm*—William S. Andes; Francis L. Conte (57) ABSTRACT

A turbine blade includes an airfoil having first and second tip ribs extending along the opposite pressure and suction sides thereof. The tip ribs are spaced apart between the leading and trailing edges of the airfoil to include a tip baffle. The baffle extends chordally in counter profile with the first rib to define a first pocket, and in counter profile with the second rib to define a second pocket.

20 Claims, 5 Drawing Sheets

U.S. PATENT DOCUMENTS

| | | |
|---|---|---|
| 6,672,829 B1 | 1/2004 | Cherry et al. |
| 6,790,005 B2 | 9/2004 | Lee et al. |
| 6,837,687 B2 * | 1/2005 | Lee et al. .................... 416/224 |

OTHER PUBLICATIONS

U.S. Appl. No. 11/162,433, "Turbine Airfoil with Curved Squealer Tip," filed Sep. 9, 2005, M.E. Stegemiller et al.

U.S. Appl. No. 11/162,434, "Turbine Airfoil Curved Squealer Tip with Tip Shelf," filed Sep. 9, 2005, M.E. Stegemiller et al.

U.S. Appl. No. 11/507,119, filed Aug. 21, 2006, by K.S. Klasing at al.

U.S. Appl. No. 11/507,116, filed Aug. 21, 2006, by K.S. Klasing et al.

U.S. Appl. No. 11/507,120, filed Aug. 21, 2006, by K.S. Klasing at al.

U.S. Appl. No. 11/507,121, filed Aug. 21, 2006, by K.S. Klasing et al.

* cited by examiner

FIG. 5

COUNTER TIP BAFFLE AIRFOIL

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes. The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes an airfoil having first and second tip ribs extending along the opposite pressure and suction sides thereof. The tip ribs are spaced apart between the leading and trailing edges of the airfoil to include a tip baffle. The baffle extends chordally in counter profile with the first rib to define a first pocket, and in counter profile with the second rib to define a second pocket.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
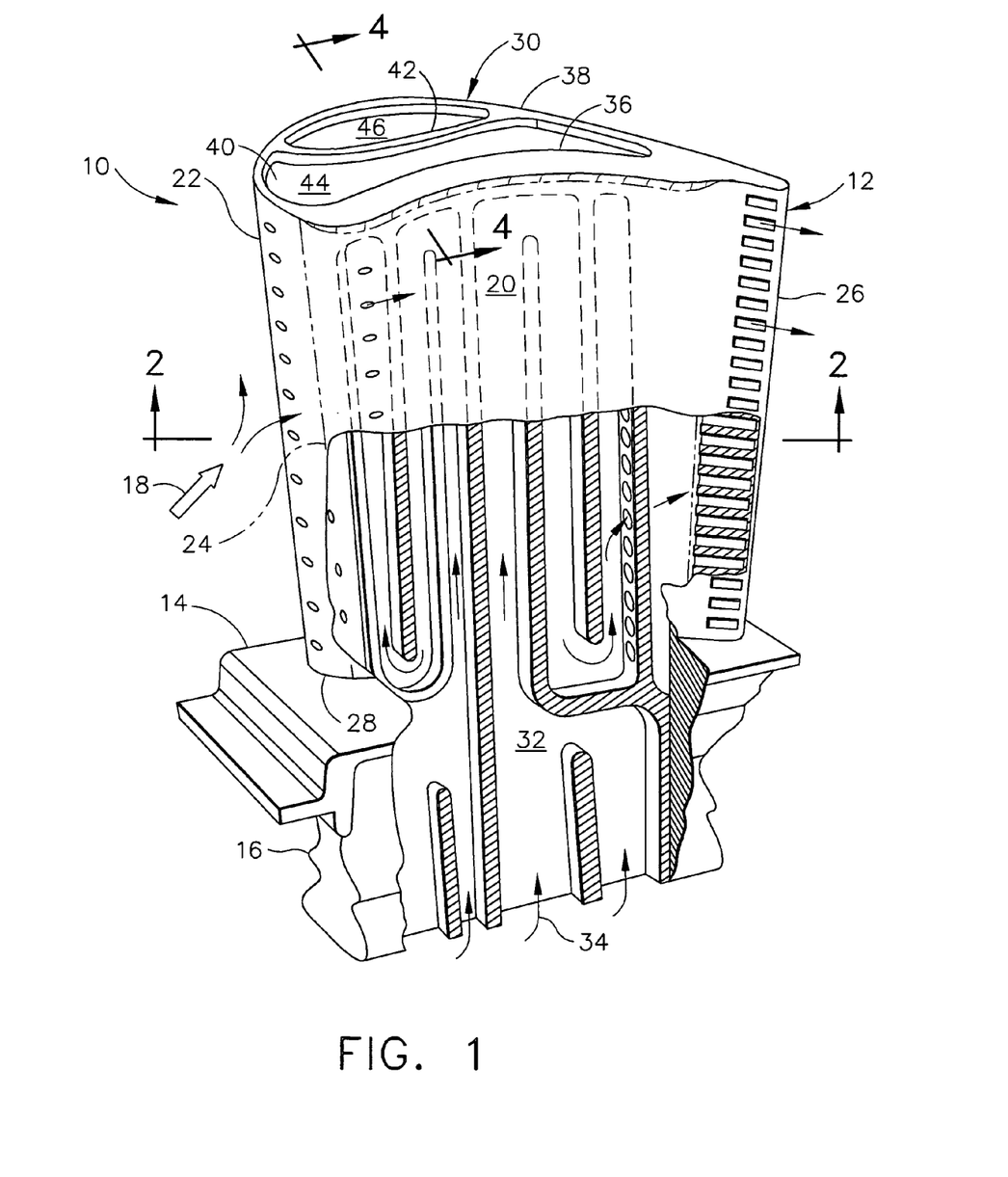
FIG. 1 is a partly sectional isometric view of an exemplary turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
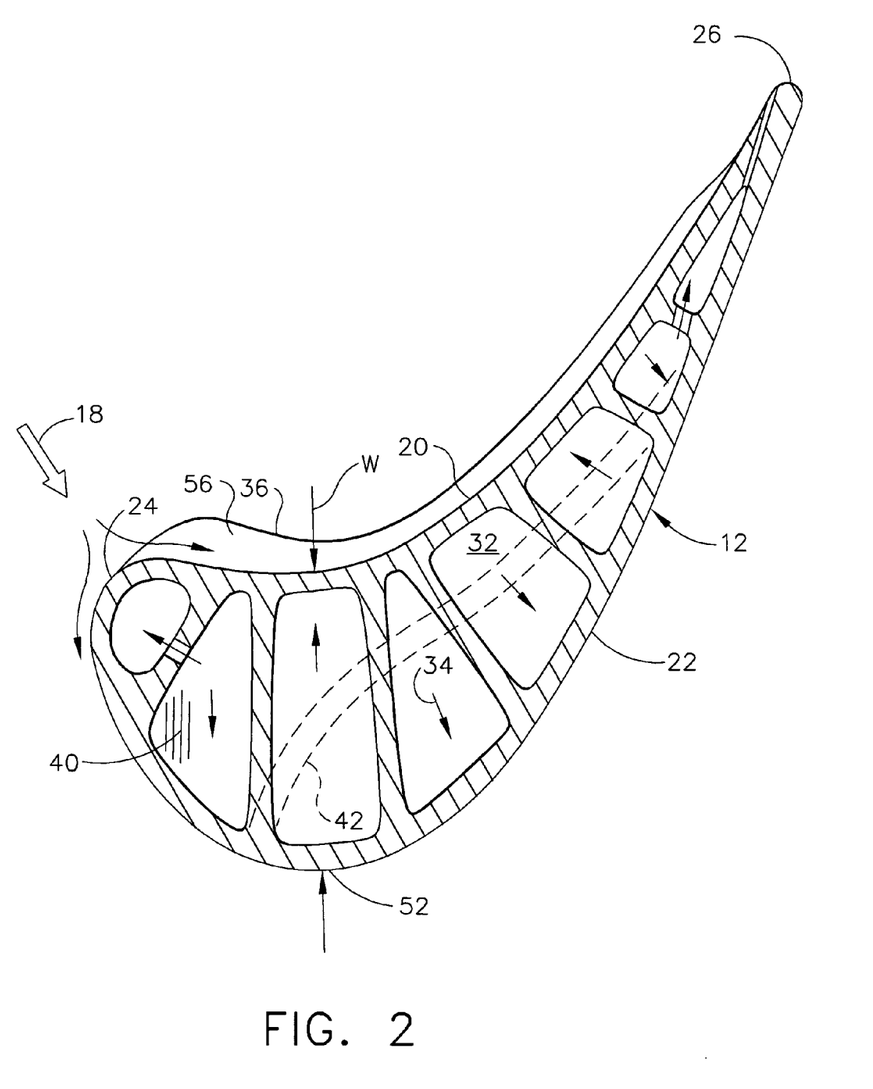
FIG. 2 is a radial sectional view through the airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26 and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil.

Figure 3:
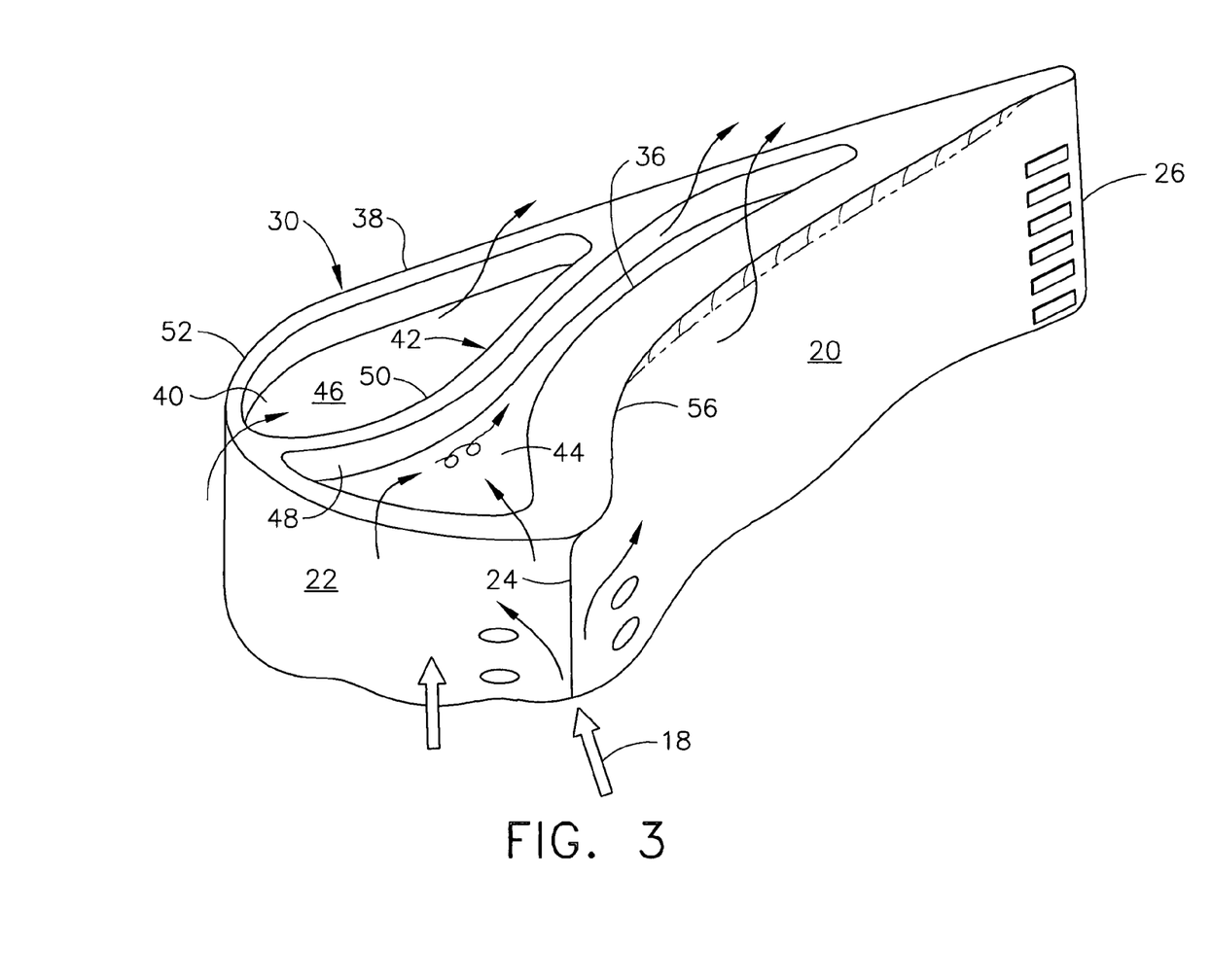
FIG. 3 is an enlarged isometric view of the airfoil tip illustrated in FIG. 1.
Figure 4:
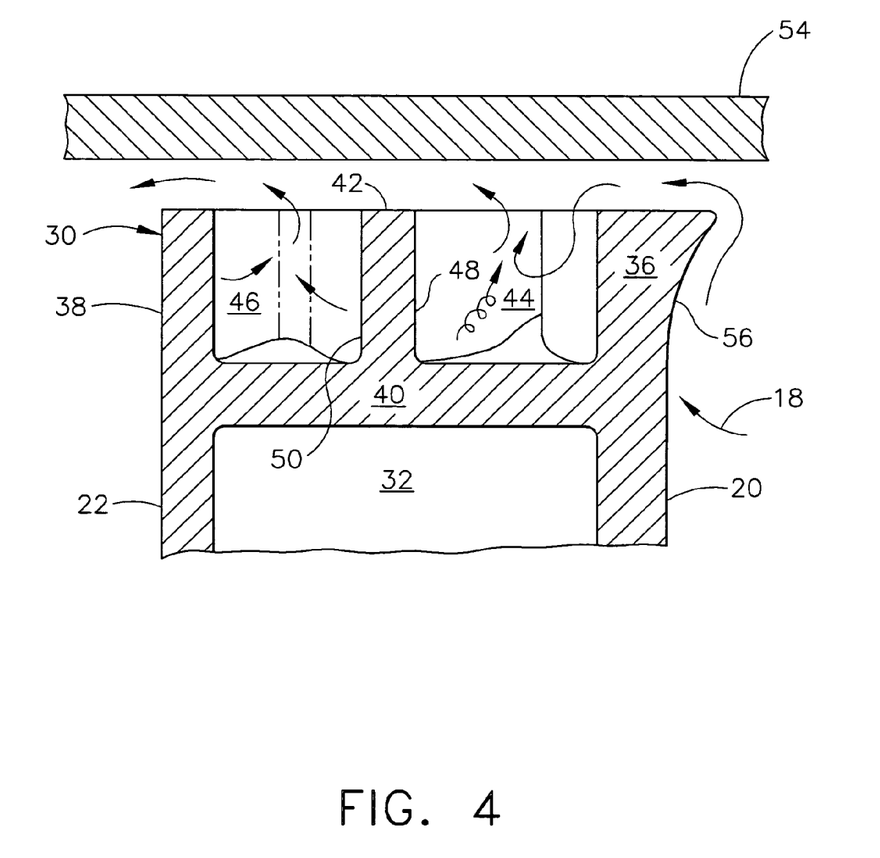
FIG. 4 is a transverse, radial sectional view through the airfoil tip illustrated in FIG. 1 and taken along line 4-4.

As shown in FIGS. 1, 3, and 4 the airfoil also includes a tip floor 40 which bridges the opposite sides 20,22 to enclose the internal cooling circuit 32. The tip floor 40 is typically solid, but may have small cooling holes or dust holes (not shown) for discharging some of the spent air from the internal cooling circuit in any conventional manner. The two ribs 36,38 extend radially outwardly from the common tip floor 40 as continuations or extensions of the corresponding sidewalls of the airfoil which define the opposite pressure and suction side surfaces thereof.

The two ribs 36,38 are integrally joined together at the opposite leading and trailing edges 24,26 of the airfoil and provide a full perimeter extension of the aerodynamic pressure and suction sides of the airfoil.

Between the leading and trailing edges, the two ribs 36,38 are spaced transversely or circumferentially apart to include a counter tip baffle or rib 42 which extends axially or chordally between the leading and trailing edges. The tip baffle 42 is specially configured in counter profile or contour with the first rib 36 to define a corresponding first tip cavity or pocket 44 extending chordally along the first rib. And, the tip baffle is additionally configured in counter profile with also the second rib 38 to define a corresponding second tip cavity or pocket 46 extending chordally along the second rib.

As shown in FIGS. 3 and 4 the tip baffle 42 has a rectangular transverse cross section, with a first side 48 laterally facing the corresponding inboard side of the first rib 36 in opposite and different chordal profiles or contours therewith. And, the tip baffle also includes an opposite second side 50 laterally facing the corresponding inboard side of the second rib 38 in opposite and different chordal profiles or contours therewith.

The airfoil 12 is illustrated in radial cross section in FIG. 2 with the typical crescent profile and increases in transverse width W aft from the leading edge 24 to a maximum width at a hump 52 in the convex suction side 22. From the hump, the airfoil then converges aft to the trailing edge 26 as required for maximizing aerodynamic performance.

As shown in FIGS. 2 and 3, the tip baffle 42 commences along the suction side of the airfoil chordally between the leading edge 24 and the hump 52, with a suitable intermediate spacing therebetween. The baffle 42 preferably terminates along the suction side chordally between the hump 52 and the trailing edge 26 at a suitable intermediate spacing therebetween.

FIG. 4 illustrates in radial section the airfoil tip 30 suitably mounted inside a conventional turbine shroud 54, shown in relevant part, to provide a relatively small radial clearance or gap therebetween. The combustion gases 18 during operation leak over the pressure side 20 of the airfoil, through the radial clearance, and are discharged over the lower pressure suction side 22 of the airfoil.

The first and second ribs 36,38 and the tip baffle 42 spaced circumferentially therebetween extend in common height or span from the tip floor 40 to provide a substantially constant radial gap with the inner surface of the surrounding turbine shroud 54. The radially outer surfaces of the airfoil tip illustrated in FIGS. 1, 3, and 4 are therefore coplanar with each other for providing a close, sealing fit with the surrounding shroud.

As shown in FIG. 3, the first and second tip pockets 44,46 converge and diverge, respectively, in opposition with each other aft from the common suction side 22 where they commence and aft along the opposite sides 48,50 of the tip baffle 42. The two tip pockets 44,46 complement each other on opposite sides of the common tip baffle 42, with that baffle 42 being counter or reverse in chordal profile to the correspondingly differently profiled first and second tip ribs 36,38 for enhancing performance of the airfoil.

As shown in FIGS. 3 and 4, the first tip pocket 44 preferably converges aft to its aft end near the trailing edge of the airfoil. The second pocket 46 initially diverges in its forward portion and then converges aft in its aft portion to its aft end at the corresponding end of the tip baffle.

In the preferred embodiment illustrated in FIG. 3, the tip baffle 42 commences integrally with the second rib 38 at a substantially normal or perpendicular integral joint therewith. This forward junction of the baffle and second rib 38 occurs near the hump 52 and preferably closely upstream therefrom and permits the single tip baffle 42 to circumferentially or transversely bifurcate the tip 30 into only the two sub-pockets 44,46 thereof.

In the preferred embodiment illustrated in FIG. 3, the tip baffle 42 extends continuously to and terminates integrally with the second rib 38 at an integral joint therewith. In this way, the second tip pocket 46 is fully bounded around its perimeter by the second rib 38 on the suction side and by the tip baffle 42 itself on the opposite side. The tip baffle blends smoothly with the second rib 38 as it extends aft toward the trailing edge and converges with the opposite first rib 36.

Correspondingly, the first pocket 44 is itself fully bounded around its perimeter by the first rib 36 on the pressure side of the airfoil, and on the opposite suction side of the tip baffle 42, along with the corresponding forward and aft portions of the second rib 38 to which it is attached, collectively bound the first pocket. In this configuration, the first pocket 44 commences on the suction side of the airfoil at the leading edge and continues aft along the tip baffle, and aft of the termination of the first pocket 46 along the second rib 38.

FIG. 3 illustrates from above, and FIG. 2 illustrates in dashed line from below, a preferred profile of the tip baffle 42. The first side 48 of the baffle is chordally convex along the forward portion of the baffle and laterally faces the convex inboard side of the first rib 36, which is correspondingly concave on its external side. Correspondingly, the second side 50 of the baffle is chordally concave along the forward portion of the baffle and laterally faces the concave inboard side of the second rib 38, whose exterior surface matches the convex profile of the airfoil suction side.

The tip baffle 42 includes an inflection region between its opposite ends to complement the tapering profile of the airfoil towards its trailing edge. In particular, the first side 48 of the tip baffle 42 is preferably concave along the aft portion of the baffle and laterally faces the convex inboard side of the first rib 36 in this region. Correspondingly, the second side 50 of the baffle is chordally convex along the aft portion of the baffle and laterally faces the aft portion of the second rib 38.

As shown in FIG. 2, the pressure side 20 of the airfoil is most concave along its forward portion and aerodynamically complements the airfoil suction side 22 which is most convex around its forward portion including the hump region. From the hump aft, the airfoil converges to the common trailing edge, with the aft portion of the pressure and suction sides having less curvature and approaching substantially straight chordal profiles near the trailing edge.

Correspondingly, the tip baffle 42 has a generally S-shaped profile to counter in opposition the corresponding reverse profiles of the transversely opposite first and second ribs 36,38 as they vary in profile between the leading and trailing edges of the airfoil. The counter or reverse profile of the tip baffle 42 at its forward end is disposed substantially normal to the highly convex profile of the second rib 38. And, the shallow profile of the aft end of the tip baffle blends smoothly with the shallow profile of the second rib 38 as it extends to the trailing edge.

As indicated above in the Background section, the 3D configuration of the turbine blade is highly complex and the turbine airfoil is operated in the highly complex 3D flow field of the combustion gases 18 which are split around the airfoil leading edge during operation. FIG. 3 illustrates exemplary streamlines of the split gas flow around the aerodynamic profile of the airfoil tip. CFD analysis has been performed on the exemplary embodiment illustrated in FIG. 3 to confirm performance improvements therefrom compared with a reference design having a single tip cavity without the bifurcating tip baffle therein.

The introduction of the tip baffle disclosed above may be used in specific designs for improving turbine efficiency as well as reducing leakage of the combustion gases over the airfoil tip through the tip-shroud clearance.

Turbine efficiency is based on the ability of the airfoil surfaces to extract energy from the differential pressure in the combustion gases acting over the pressure and suction sides of the airfoil from root to tip and between the leading and trailing edges. The introduction of the tip baffle 42 provides additional surface area at the blade tip against which the tip flow may perform additional work on the blade. The tip baffle also provides an additional seal like the two squealer tip ribs 36,38 themselves for reducing tip flow leakage.

Tip leakage includes both axial and circumferential components in view of the 3D configuration of the airfoil tip illustrated in FIG. 3 for example. The combustion gases 18 engage the airfoil around its leading edge 24 both in axial and circumferential directions due to the skewed inlet angle from the upstream turbine nozzle (not shown). The tip baffle 42 preferably commences near the hump of the suction side of the airfoil as specifically controlled by the incident flow streamlines.

It is desired to place the tip baffle 42 so that it captures incident flow streamlines over the forward portion of the second rib 38 to funnel them inside the first tip pocket 44 bounded by the tip baffle 42 itself. The leakage gases are funneled through the first pocket 44 in secondary flow fields that pressurize the first pocket while being guided aft along the tip baffle itself. The so pressurized first pocket 44 increases turbine efficiency by extracting additional energy from the tip baffle itself, and also discourages further leakage over the tip gap by the increased pressure therein.

Correspondingly, some of the leakage gases captured by the first pocket 44 will flow over the tip baffle into the second pocket 46 and are further funneled in the aft direction therein. The leakage gases from both pockets 44,46 will then be discharged over the aft portion of the suction side second rib 38 in the downstream direction.

Accordingly, the specifically configured and located tip baffle 42 provides a simple mechanism to reduce both axial and circumferential leakage of the combustion gases as they flow over the airfoil tip during operation, while correspondingly improving turbine efficiency.

Furthermore, the introduction of the tip baffle 42 biases the tip leakage more aft along the chord of the airfoil where the airfoil tapers to the trailing edge which reduces the loss in efficiency due to that very leakage itself.

In the preferred embodiment illustrated in FIGS. 3 and 4, the tip baffle 42 is positioned near the transverse middle between the opposite sides of the airfoil for maximizing the local widths of the two pockets 44,46. If the pocket width is too small, the leakage gases may simply overflow the pocket without generating significant local flow fields therein and thereby limiting performance improvement from the baffle. For this reason, the baffle 42 terminates suitably upstream from the thin trailing edge of the airfoil illustrated in FIG. 3 for maintaining a suitable minimum width of both pockets 44,46 in their aft regions for maximizing the performance advantages thereof.

In the exemplary embodiment of the turbine blade illustrated in FIGS. 1-4, both the second squealer rib 38 and tip baffle 42 have similar rectangular transverse sections extending radially outwardly from the common tip floor 40, and may be about 20-25 mils (0.5-0.6 mm) wide. The first squealer rib 36, however, may include an arcuate flare 56 along the pressure side 20 of the airfoil for further discouraging flow leakage in another improvement for turbine blades.

The height of the ribs and pockets may be about 40 mils (1.0 mm). And, the minimum width of the two pockets 44,46 may be about 30 mils (0.76 mm).

Figure 5:
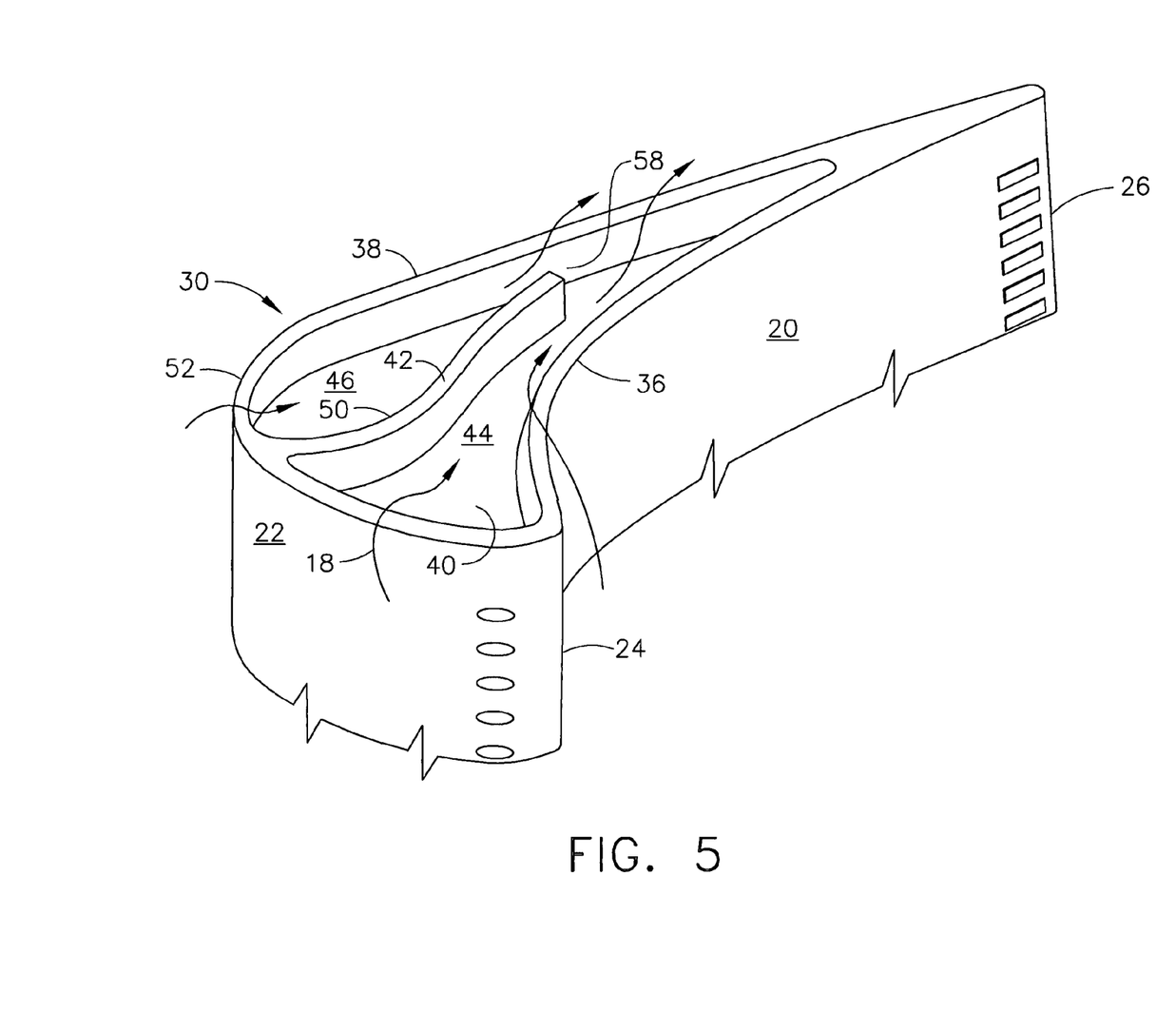
FIG. 5 is an isometric view, like FIG. 3, of the airfoil tip in accordance with another embodiment.

FIG. 5 illustrates an alternate embodiment of the airfoil tip, like FIG. 3, but with the tip baffle 42 terminating short of the airfoil suction side, without connection thereto, and transversely between the first and second ribs 36,38. And, the pressure-side flare 56 is not present, with the first rib 36 having the same rectangular cross section as the second rib 38.

In this embodiment, the aft end of the so-truncated tip baffle 42 is spaced upstream from the inboard side of the second rib 38 to define a small gap 58 therebetween. And, the second pocket 46 terminates in flow communication with the first pocket 44 at the gap 58 therebetween, and the first pocket 44 continues aft from the second pocket towards the trailing edge 26 of the airfoil within the available space of the converging and thinning airfoil.

The specific configuration and profile of the truncated tip baffle 42 and cooperating first and second ribs 36,38, and the first and second pockets 44,46 defined thereby may be otherwise identical to the first embodiment illustrated in FIGS. 1-4 and enjoys similar advantages.

CFD analysis of the similar designs illustrated in FIGS. 3 and 5 indicate substantially identical reduction in tip flow leakage over the corresponding airfoils. However, the full length tip baffle 42 illustrated in FIG. 3 results in a significantly improved turbine efficiency compared to the smaller, but yet still significant, improvement in turbine efficiency attributable to the partial-length embodiment of the tip baffle illustrated in FIG. 5.

It would appear that interruption in the chordal continuity of the tip baffle 42 illustrated in FIG. 5 limits the ability to pressurize the first pocket 44 and extract additional energy from the combustion gases as they are confined along the pressure side of the tip baffle itself.

The introduction of the relatively simple tip baffle 42 in the turbine blade disclosed above requires little change to the blade itself, with a corresponding minor increase in weight thereof. However, the simple tip baffle may be used to significantly improve turbine efficiency in a full row of the turbine blades, while also significantly reducing gas flow leakage over the airfoil tip.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
    an airfoil, platform, and integral dovetail;
    said airfoil having opposite pressure and suction sides extending in chord between leading and trailing edges and extending in span from root to tip;
    said tip including first and second ribs extending from a tip floor along said pressure and suction sides, respectively; and
    said first and second ribs are joined together at said opposite leading and trailing edges and are spaced transversely apart to include a tip baffle extending chordally in counter profile with said first rib to define a first pocket therealong and in counter profile with said second rib to define a second pocket therealong.

2. A blade according to claim 1 wherein said tip baffle includes a first side facing said first rib in opposite profiles, and a second side facing said second rib in opposite profiles.

3. A blade according to claim 2 wherein said airfoil increases in width aft from said leading edge to a maximum width at a hump in said suction side, and then converges to said trailing edge, and said tip baffle commences between said leading edge and hump and terminates between said hump and trailing edge.

4. A blade according to claim 3 wherein said tip baffle commences integrally with said second rib near said hump to bifurcate said tip into said first and second pockets.

5. A blade according to claim 4 wherein said first and second pockets converge and diverge, respectively, in opposition aft along said opposite sides of said tip baffle.

6. A blade according to claim 5 wherein said first pocket converges aft to its aft end, and said second pocket converges aft to its aft end.

7. A blade according to claim 5 wherein said tip baffle terminates integrally with said second rib, and said first pocket continues aft therefrom.

8. A blade according to claim 5 wherein said tip baffle terminates transversely between said first and second ribs, said second pocket terminates in flow communication with said first pocket, and said first pocket continues aft therefrom.

9. A blade according to claim 5 wherein said first side of said tip baffle is convex along the forward portion thereof and faces a convex inboard side of said first rib, and said second side of said tip baffle is concave along the forward portion thereof and faces a concave inboard side of said second rib.

10. A blade according to claim 5 wherein said first side of said tip baffle is concave along the aft portion thereof and faces said convex inboard side of said first rib, and said second side of said tip baffle is convex along the aft portion thereof and faces said second rib.

11. A turbine blade comprising an airfoil tip having a pressure-side first rib joined to a suction-side second rib at opposite leading and trailing edges and spaced transversely apart to include a tip baffle extending chordally in counter profile with said first rib to define a first pocket therealong and in counter profile with said second rib to define a second pocket therealong.

12. A blade according to claim 11 further including an airfoil having a concave pressure side and an opposite convex suction side, and said tip baffle includes a first side facing said first rib in opposite profiles, and an opposite second side facing said second rib in opposite profiles.

13. A blade according to claim 12 wherein said airfoil increases in width aft from said leading edge to a maximum width at a hump in said suction side, and then converges to said trailing edge, and said tip baffle commences between said leading edge and hump and terminates between said hump and trailing edge.

14. A blade according to claim 13 wherein said airfoil further includes a tip floor from which said first and second ribs and tip baffle extend in common height, and said first and second pockets converge and diverge, respectively, in opposition aft along said opposite sides of said tip baffle.

15. A blade according to claim 11 wherein said first and second ribs and tip baffle are integrally joined together in said airfoil tip in a one-piece metal casting.

16. A blade according to claim 14 wherein said tip baffle commences integrally with said second rib near said hump to bifurcate said tip into said first and second pockets; and said first pocket converges aft to its aft end, and said second pocket converges aft to its aft end.

17. A blade according to claim 16 wherein said tip baffle terminates integrally with said second rib, and said first pocket continues aft therefrom.

18. A blade according to claim 16 wherein said tip baffle terminates transversely between said first and second ribs, said second pocket terminates in flow communication with said first pocket, and said first pocket continues aft therefrom.

19. A blade according to claim 14 wherein said first side of said tip baffle is convex along the forward portion thereof and faces a convex inboard side of said first rib, and said second side of said tip baffle is concave along the forward portion thereof and faces a concave inboard side of said second rib.

20. A blade according to claim 19 wherein said first side of said tip baffle is concave along the aft portion thereof and faces said convex inboard side of said first rib, and said second side of said tip baffle is convex along the aft portion thereof and faces said second rib.

\* \* \* \* \*

UNITED STATES PATENT AND TRADEMARK OFFICE
CERTIFICATE OF CORRECTION

PATENT NO. : 7,607,893 B2
APPLICATION NO. : 11/507132
DATED : October 27, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Twelfth Day of October, 2010

David J. Kappos
*Director of the United States Patent and Trademark Office*